US010151656B2

United States Patent
Yamagishi et al.

(10) Patent No.: US 10,151,656 B2
(45) Date of Patent: Dec. 11, 2018

(54) PRESSURE SENSOR CONFIGURED TO DETECT PRESSURE OF FLUID TO BE MEASURED THAT EMBRITTLES MATERIAL

(71) Applicant: NAGANO KEIKI CO., LTD., Tokyo (JP)

(72) Inventors: Nobutaka Yamagishi, Tokyo (JP); Naoki Yamashita, Tokyo (JP); Atsushi Imai, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 148 days.

(21) Appl. No.: 15/269,169

(22) Filed: Sep. 19, 2016

(65) Prior Publication Data

US 2017/0089784 A1    Mar. 30, 2017

(30) Foreign Application Priority Data

Sep. 25, 2015   (JP) ................. 2015-188666

(51) Int. Cl.
| | |
|---|---|
| *G01L 7/08* | (2006.01) |
| *G01L 9/00* | (2006.01) |
| *G01L 19/00* | (2006.01) |
| *G01L 19/06* | (2006.01) |
| *G01L 19/14* | (2006.01) |

(52) U.S. Cl.
CPC ............ *G01L 7/082* (2013.01); *G01L 9/0041* (2013.01); *G01L 19/0038* (2013.01); *G01L 19/0627* (2013.01); *G01L 19/143* (2013.01)

(58) Field of Classification Search
None
See application file for complete search history.

(56) References Cited

U.S. PATENT DOCUMENTS

| 2007/0013014 A1* | 1/2007 | Guo ................. C23C 14/021 |
| | | 257/417 |
| 2010/0002745 A1* | 1/2010 | Stoll ................. G01D 11/245 |
| | | 374/143 |

FOREIGN PATENT DOCUMENTS

| EP | 1 520 639 A1 | 4/2005 |
| EP | 2559987 A2 | 2/2013 |

(Continued)

OTHER PUBLICATIONS

European Search Report dated Jul. 10, 2017, 12 pages.
Partial European Search Report dated Feb. 22, 2017.
Japanese Notice of Allowance dated May 8, 2018, 1 page.

*Primary Examiner* — Andre J Allen
(74) *Attorney, Agent, or Firm* — Rankin, Hill & Clark LLP

(57) ABSTRACT

A pressure sensor includes a pressure sensor element, a joint provided to a target member, and an attachment member that is fitted into the joint through the connection section and connected to the target member. Each of the pressure sensor element and the joint is formed of a material that is not embrittled upon being in contact with a fluid to be measured that embrittles a material, and more rigid than the attachment member. The connection section is subjected to a plastic deformation connection (metal flow). An expensive hydrogen embrittlement resistant material is used for the pressure sensor element and the joint that are brought into contact with the fluid to be measured, and an inexpensive material is used for the attachment member that is not brought into contact with the fluid to be measured, thereby reducing the production cost of the pressure sensor.

6 Claims, 3 Drawing Sheets

(56) References Cited

FOREIGN PATENT DOCUMENTS

| | | |
|---|---|---|
| JP | 03-273126 | 12/1991 |
| JP | 2001-235383 | 8/2001 |
| JP | 2002-168718 | 6/2002 |
| JP | 2005-114734 | 4/2005 |
| JP | 2006-038538 | 2/2006 |
| JP | 2006-349682 | 12/2006 |
| JP | 4127532 | 5/2008 |
| JP | 4185477 | 9/2008 |
| JP | 4185478 | 9/2008 |
| JP | 4876895 | 12/2011 |
| JP | 2012-500974 | 1/2012 |
| JP | 5278143 | 5/2013 |
| WO | 2010/022373 A1 | 2/2010 |
| WO | 2013/083320 A1 | 6/2013 |

* cited by examiner

PRESSURE SENSOR CONFIGURED TO DETECT PRESSURE OF FLUID TO BE MEASURED THAT EMBRITTLES MATERIAL

The entire disclosure of Japanese Patent Application No. 2015-188666 filed Sep. 25, 2015 is expressly incorporated by reference herein.

TECHNICAL FIELD

The present invention relates to a pressure sensor.

BACKGROUND ART

A pressure sensor configured to measure a pressure of a fluid to be measured has been known.

Conventional examples of the pressure sensor are described in the following Patent Literatures 1 to 7.

According to the conventional example of Patent Literature 1 (JP-B-4876895), a metal stem mainly made of Fe and Ni is inserted into a pressure introducing passage of a housing made of stainless steel such as SUS430, a sensor chip is provided to a diaphragm disposed at a first end of the metal stem, and an open end located at a second end of the metal stem is laser-welded to, pressed into, or caulked to the pressure introducing passage of the housing.

According to the conventional example of Patent Literature 2 (JP-A-2005-114734), an insertion body is inserted into a hole of a hexagonal portion of a pressure sensor assembly, a threaded portion made of stainless steel is mounted on the insertion body, and a welded portion is formed at an outer circumferential portion of the insertion body and an inner circumferential portion of the hexagonal portion by laser welding or the like.

According to the conventional example of Patent Literature 3 (JP-A-2006-349682), a pressure sensor element made of steel and a pressure tube piece are provided to a hexagonal flange, and a joined portion between the pressure sensor element and the pressure tube piece is firmly and hydraulically tightly connected to the hexagonal flange.

According to the conventional example of Patent Literature 4 (JP-B-4185478), a strain generating body that generates strain in response to an external stress is made of austenitic precipitation hardening Fe—Ni heat-resisting steel.

According to the conventional example of Patent Literature 5 (JP-B-4185477), a pressure detecting element having a bottomed cylindrical member is provided to a pressure introducing joint, and each of the bottomed cylindrical member and the pressure introducing joint is made of austenitic precipitation hardening Fe—Ni heat-resisting steel.

According to the conventional example of Patent Literature 6 (JP-B-4127532), a cylindrical member is provided to a joint, and the cylindrical member and the joint are joined to each other by plastic deformation joining referred to as metal flow.

According to the conventional example of Patent Literature 7 (JP-B-5278143), a housing having a hexagonal portion is welded to a stem made of Fe and Ni.

A pressure sensor is used in a fuel cell device. In the fuel cell device, since a fluid to be measured is hydrogen, a material for a portion of the pressure sensor to be in contact with the fluid to be measured is required to be a hydrogen embrittlement resistant material (high nickel material) that is not embrittled upon being in contact with hydrogen. The hydrogen embrittlement resistant material is more expensive than other materials such as stainless. In addition to hydrogen, there is a fluid to be measured that is corrosive to a material. Accordingly, a material that is not embrittled by the fluid to be measured flowing therethrough is expensive.

In the conventional example of Patent Literature 1, since the fluid to be measured is a fuel for vehicles and the housing in which the pressure introducing passage is formed is made of stainless steel such as SUS430, it is impossible to use the pressure sensor as it is in a fuel cell device.

In the conventional example of Patent Literature 2, each of the hexagonal portion and the insertion body is made of stainless steel, and a circumferential surface of the hole of the hexagonal portion and the insertion body are welded to each other. The welding between stainless members results in a high production cost.

In the conventional example of Patent Literature 3, the pressure sensor element and the pressure tube piece are made of steel and welded to each other. The welding between steel members results in a high production cost.

In the conventional examples of Patent Literatures 4 and 5, the fluid to be measured is hydrogen, and the portion to be in contact with the fluid to be measured is made of a material that is not embrittled upon being in contact with hydrogen. However, details of an attachment member for attaching the pressure introducing joint to a target member are not disclosed in Patent Literatures 4 and 5. Accordingly, it is not possible to easily attach the pressure sensor to the target member.

In the conventional example of Patent Literature 6, it is merely disclosed that the metal flow is used to join the components of the pressure sensor, and it is not disclosed that the fluid to be measured is hydrogen. Accordingly, a specific configuration of the pressure sensor for a fuel cell, in which the joint is easily attached to the connecting member and the production cost is reduced, cannot be conceived based on the conventional example of Patent Literature 6.

In the conventional example of Patent Literature 7, the fluid to be measured is a fuel for vehicles. Accordingly, it is not supposed that hydrogen is used as the fluid to be measured based on Patent Literature 7. Even when the stem is made of the hydrogen embrittlement resistant material, the stem and the housing are welded to each other. The material for use in welding is limited, thereby resulting in high production cost.

SUMMARY OF THE INVENTION

An object of the invention is to provide a pressure sensor capable of measuring a pressure of a fluid to be measured that embrittles a material and reducing a manufacturing cost thereof.

A pressure sensor according to an aspect of the invention is configured to detect a pressure of a fluid to be measured that embrittles a material. The pressure sensor includes: a pressure sensor element configured to be displaced in accordance with the pressure of the fluid to be measured; a joint provided with a hole section through which the fluid to be measured is introduced to the pressure sensor element, the joint being configured to be provided to a target member; and an attachment member configured to be fitted into the joint through a connection section and connected to the target member. A portion of each of the pressure sensor element and the joint, which is brought into contact with the fluid to be measured, is formed of a material that is not embrittled upon being in contact with the fluid to be measured and more rigid than the attachment member. The connection section is formed when at least one of the outer circumferential portion of the joint and the attachment member is locally plastically deformed upon receiving a circumferential force to bite into a deformation pressure trapping section of the other one of the outer circumferential portion of the joint and the attachment member, and a certain elastic deformation pressure remains at the connection section and the elastic deformation pressure is trapped by the deformation pressure trapping section, so that the joint and the attachment member are firmly axially connected to each other.

In the above aspect of the invention, since the connection section formed on each of the joint and the attachment member is subjected to the plastic deformation connection referred to as metal flow, the joint and the attachment member are integrated together, such that the pressure sensor element and the joint are attached to the target member through the attachment member.

In the above aspect of the invention, the pressure sensor includes the pressure sensor element, the joint and the attachment member. An expensive hydrogen embrittlement resistant material is used for the pressure sensor element and the joint which are brought into contact with hydrogen or another fluid to be measured, and an inexpensive material is used for the attachment member which is not brought into contact with the fluid to be measured, thereby reducing the production cost of the pressure sensor.

Further, since the connection section is subjected to the plastic deformation connection, even when the connection section is brought into contact with gas from the outside, the gas does not enter through the connection section. Accordingly, the pressure sensor is not brought into contact with the gas.

In the above arrangement, it is preferable that the attachment member includes an abutting surface that abuts the target member near the outer circumferential portion remote from the hole section with respect to the connection section and a step that is formed at a position near the hole section with respect to the abutting surface and brought into contact with the connection section, such that the step is spaced apart from the target member.

In this arrangement, since the step of the attachment member is spaced apart from the target member, the connection section does not abut the target member at the time of attaching the attachment member and the joint to the target member, and therefore it is possible to prevent generation of unexpected stress on the connection section.

In the above arrangement, it is preferable that the joint includes a joint flange having an outer circumferential surface on which the connection section is formed, an opposed surface is formed on the joint flange so as to face the target member, and the opposed surface of the joint flange facing the target member is spaced apart from the target member.

In this arrangement, since not only the step but also the opposed surface of the joint flange is spaced apart from the target member, it is possible to securely prevent generation of unexpected stress on the connection section.

In the above arrangement, it is preferable that the joint has a male thread configured to be screwed into the target member, and a locking surface configured to be locked with a tool so as to screw the joint into the target member is formed on an outer circumferential portion of the attachment member.

In the above arrangement, it is possible to easily attach the pressure sensor to the target member by screwing the attachment member using a tool or the like.

In the above arrangement, it is preferable that a cross sectional profile of the connection section in a direction intersecting an axial direction of the connection section has a non-circular portion (i.e., portion not constituting an arc).

In the above arrangement, since the cross sectional profile of the connection section has the non-circular portion, the attachment member does not run idle at the time of screwing the joint into the target member by the attachment member. Here, the profile of the non-circular portion is exemplified by a chord obtained by cutting a part of a circle, a quadrangle, a hexagon, and the like.

In the above arrangement, the attachment member is preferably formed of a material containing aluminum.

In the above arrangement, since aluminum is inexpensive, the production cost of the pressure sensor is reduced. Further, since aluminum is lighter than other metals, it is possible to reduce the weight of the pressure sensor itself.

BRIEF DESCRIPTION OF DRAWING(S)

DESCRIPTION OF EMBODIMENT(S)

Exemplary embodiment(s) of the invention will be described below with reference to the attached drawings.

First Exemplary Embodiment

Figure 1:
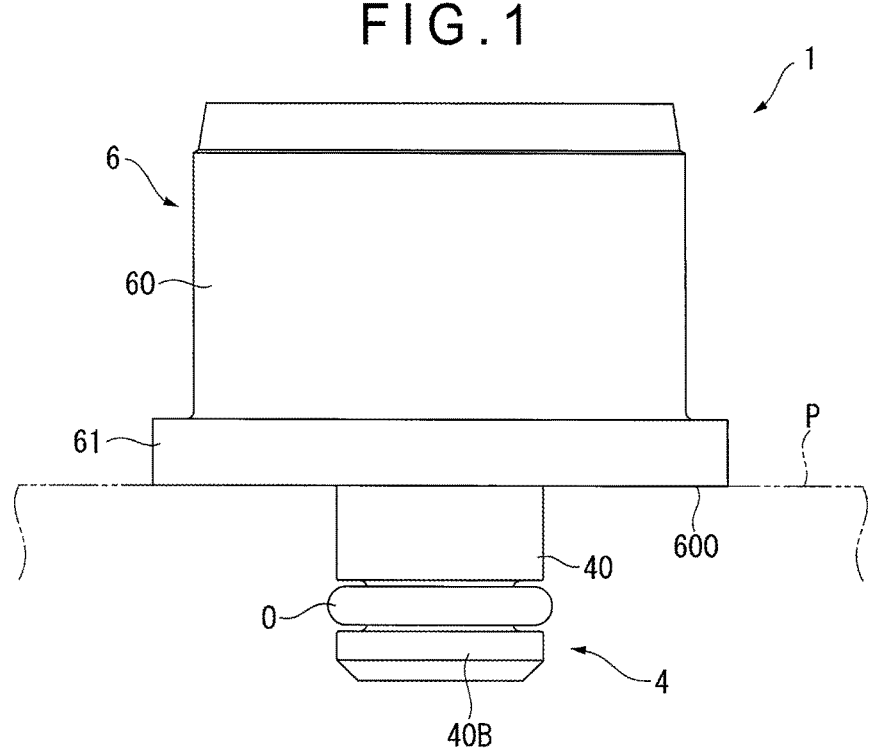
FIG. 1 is a front elevational view of a pressure sensor according to a first exemplary embodiment of the invention.
Figure 2:
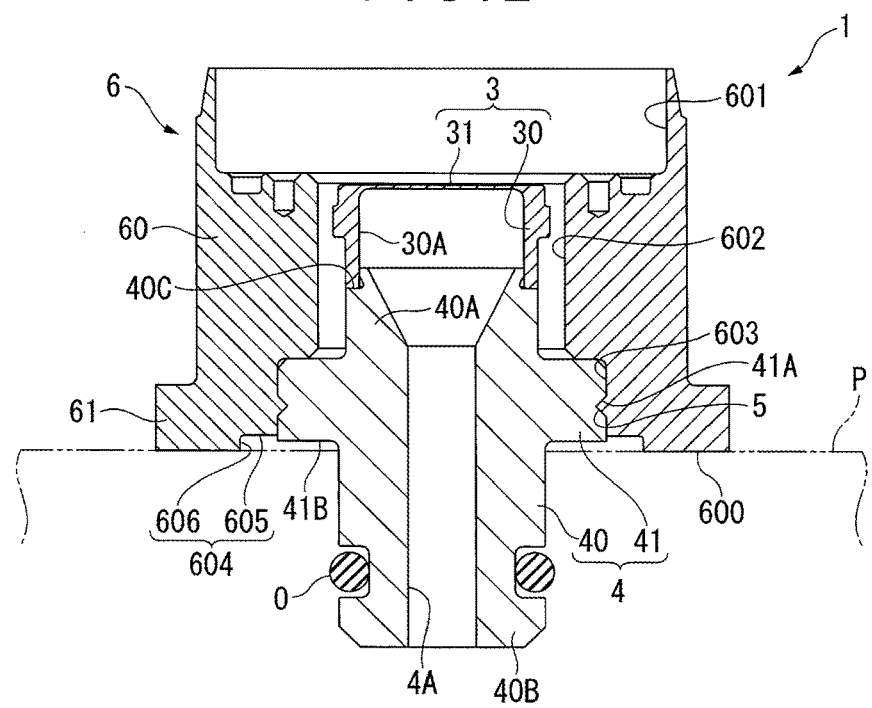
FIG. 2 is a cross section of the pressure sensor according to the first exemplary embodiment of the invention.

A pressure sensor 1 of a first exemplary embodiment is illustrated in FIGS. 1 and 2.

As shown in FIGS. 1 and 2, the pressure sensor 1 is configured to detect a pressure of hydrogen (fluid to be measured) that embrittles a material, which is provided to a target member P through which the fluid to be measured flows. The target member P is a pipe to be used for a fuel cell vehicle or the like, through which hydrogen flows.

The pressure sensor 1 includes a pressure sensor element 3 configured to be displaced in accordance with a pressure of the fluid to be measured, a joint 4 provided with the hole section 4A through which the fluid to be measured is introduced to the pressure sensor element 3, and an attachment member 6 configured to be fitted into the joint 4 through a connection section 5.

The pressure sensor element 3 includes a cylindrical section 30 and a diaphragm 31 configured to close an opening at a first end of the cylindrical section 30 that are integrated together. The fluid to be measured is introduced through the hole section 4A into an inner space 30A of the cylindrical section 30.

A second end of the cylindrical section 30 is welded to an end of the joint 4.

The diaphragm 31 is configured to be displaced in accordance with a volume of a pressure of the fluid to be measured that has been introduced into the inner space 30A, and the displacement of the diaphragm 31 is detected by a strain gauge (not shown) disposed on a flat surface of the diaphragm 31 facing the inner space 30A.

A shaft 40 and a joint flange 41 are integrated together to constitute the joint 4. The hole section 4A is formed along an axis core of the shaft 40. The joint flange 41 extends outwardly in a radial direction from an axially intermediate position of the shaft 40.

A first end 40A of the shaft 40 is provided with an engagement groove 40C with which the second end of the cylindrical section 30 is engaged. A second end 40B of the shaft 40 is provided with an O-ring O.

A V-shaped groove 41A is formed on an outer circumferential surface of the joint flange 41. An opposed surface 41B of the joint flange 41 facing a target member P is spaced apart from a surface of the target member P by a predetermined distance.

The attachment member 6 is referred to as a flange, and formed of a material containing aluminum such as aluminum oxide, in addition to pure aluminum.

The attachment member 6 includes a cylindrical main body 60 and an annular engagement section 61. The engagement section 61 is integrated with the main body 60, and engaged with the target member P using a clasp (not shown). The engagement section 61 is protruded from an outer circumferential portion of the main body 60, and attached to the target member P using a clasp (not shown). Incidentally, in the first exemplary embodiment, it is not absolutely necessary to provide the engagement section 61, and the attachment member 6 may have a cylindrical shape. In this case, an engagement hole (not shown) may be formed on the attachment member 6 such that a clasp is engaged with the engagement hole so as to attach the attachment member 6 to the target member P.

A first inner circumferential portion 601, a second inner circumferential portion 602 and a third inner circumferential portion 603 are defined in the main body 60 in a continuous manner.

The first inner circumferential portion 601 is disposed at the first end of the main body 60. The second inner circumferential portion 602 has a diameter smaller than that of the first inner circumferential portion 601, and faces the outer circumferential surface of the pressure sensor element 3 and the outer circumferential surface of the first end 40A of the shaft 40. The diaphragm 31 of the pressure sensor element 3 is exposed through an opening on the second inner circumferential portion 602 near the first inner circumferential portion 601. A step may be formed between the first inner circumferential portion 601 and the second inner circumferential portion 602 to receive a circuit board (not shown) thereon. Further, an opening may be formed at the center of the circuit board such that the strain gauge of the diaphragm 31 is connected to the circuit board through a bonding (not shown).

The third inner circumferential portion 603 has a diameter larger than that of the second inner circumferential portion 602, and faces the outer circumferential surface of the joint flange 41. A surface intersecting the outer circumferential surface of the joint flange 41 abuts the step between the third inner circumferential portion 603 and the second inner circumferential portion 602.

An abutting surface 600 that abuts the target member P is formed on a portion of the attachment member 6 facing the target member P. The abutting surface 600 is annularly formed at a position near the outer circumferential portion (i.e., remote from the hole section 4A with respect to the connection section 5), and a step 604 continuous with the connection section 5 is annularly formed at a position near the hole section 4A with respect to the abutting surface 600.

The step 604 includes an opposed surface 605 that is formed to be continuous with the third inner circumferential portion 603 and faces the target member P, and a connecting surface 606 that is formed to be continuous with the opposed surface 605 and the abutting surface 600.

The opposed surface 605 of the step 604 is spaced apart from the surface of the target member P by a predetermined distance. The connecting surface 606 has a diameter larger than that of the third inner circumferential portion 603.

Each of the pressure sensor element 3 and the joint 4 is formed of a high nickel material. The high nickel material is a material that is not embrittled upon being in contact with hydrogen as the fluid to be measured, and is more rigid than the attachment member 6.

The connection section 5 is connected through so-called metal flow. Namely, the connection section 5 is formed when the outer circumferential portion of the joint flange 41 and the third inner circumferential portion 603 of the attachment member 6 are locally plastically deformed upon receiving a circumferential force and a part of the third inner circumferential portion 603 is bit into the groove 41A (corresponding to deformation pressure trapping section). At this time, a certain elastic deformation pressure remains at a deformed portion of the connection section 5 and the elastic deformation pressure is trapped at a connecting portion at a joined portion (e.g., groove 41A). Accordingly, the joint 4 and the attachment member 6 are firmly axially connected.

In order to assemble the pressure sensor 1 having the above configuration, the pressure sensor element 3 is initially engaged with the joint 4, and the engaged portion is laser-welded along the entire circumference thereof. Subsequently, the joint 4 to which the pressure sensor element 3 is welded is pushed into the attachment member 6. While the joint flange 41 is in contact with the step between the second inner circumferential portion 602 and the third inner circumferential portion 603 of the attachment member 6, a predetermined pressing force is applied to the vicinity of the step 604 of the attachment member 6 using, for instance, a press machine to achieve the plastic deformation connection (metal flow) of the attachment member 6 and the joint flange 41.

The pressure sensor 1 thus assembled is attached to the target member P. At this time, when the attachment member 6 and the joint 4 are attached to the target member P, the connection section 5 does not abut the target member P.

The first exemplary embodiment provides the following effects.

(1) The pressure sensor element 3, the joint 4 provided to the target member P and the attachment member 6 that is fitted into the joint 4 through the connection section 5 and connected to the target member P constitute the pressure sensor 1. Each of the pressure sensor element 3 and the joint 4 is formed of a material that is not embrittled upon being in contact with hydrogen (the fluid to be measured) and more rigid than the attachment member 6. The connection section 5 is subjected to the plastic deformation connection (metal flow). Accordingly, an expensive hydrogen embrittlement resistant material is used for the pressure sensor element 3 and the joint 4 which are brought into contact with the fluid to be measured, and an inexpensive material is used for the attachment member 6 which is not brought into contact with the fluid to be measured, thereby reducing the production cost of the pressure sensor 1. Since the connection section 5 is subjected to the plastic deformation connection (metal flow), the pressure sensor element 3 is not brought into contact with the gas through the connection section 5.

(2) The attachment member 6 includes the abutting surface 600 that abuts the target member P near the outer circumferential portion remote from the hole section 4A of the joint 4 with respect to the connection section 5, and a step 604 that is formed at a position near the hole section 4A with respect to the abutting surface 600 and brought into contact with the connection section 5, such that the step 604 is spaced apart from the target member P. Accordingly, since the connection section 5 does not abut the target member P when the attachment member 6 and the joint 4 are attached to the target member P, it is possible to prevent generation of unexpected stress on the connection section 5.

(3) The joint 4 is provided with the joint flange 41 having the outer circumferential surface on which the connection section 5 is formed, and the joint flange 41 is provided with an opposed surface 41B facing the target member P. The opposed surface 41B is spaced apart from the target member P. Accordingly, since not only the step 604 of the attachment member 6 but also the opposed surface 41B of the joint flange 41 is spaced apart from the target member P, it is possible to securely prevent generation of unexpected stress on the connection section 5 at the time of attaching the pressure sensor 1 to the target member P.

(4) Since the attachment member 6 is formed of a material containing inexpensive aluminum, the production cost of the pressure sensor is reduced. Further, since aluminum is lighter than other metals, it is possible to reduce the weight of the pressure sensor itself.

(5) Since the attachment member 6 includes the annular engagement section 61, it is possible to easily attach the attachment member 6 to the target member P.

Second Exemplary Embodiment

A second exemplary embodiment of the invention will be described below with reference to FIGS. 3 to 5B.

Figure 3:
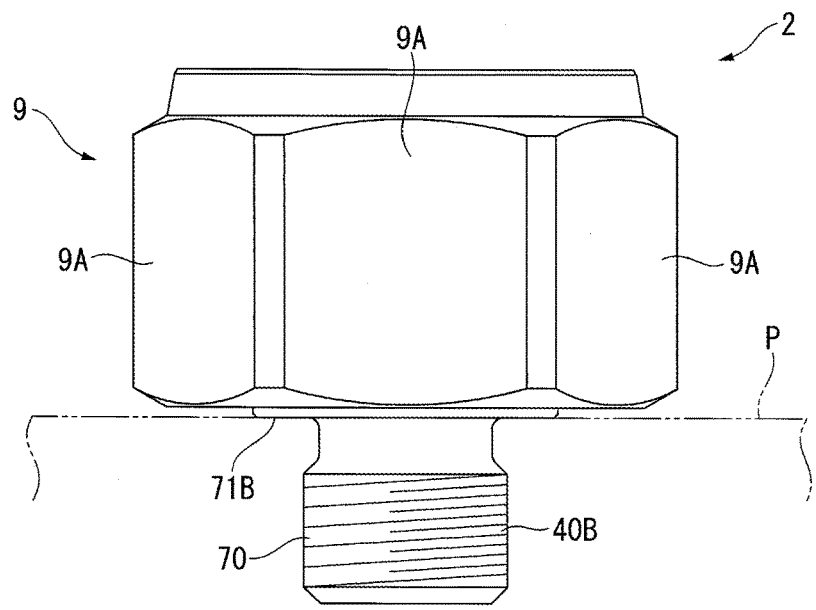
FIG. 3 is a front elevational view of a pressure sensor according to a second exemplary embodiment of the present invention.
Figure 4:
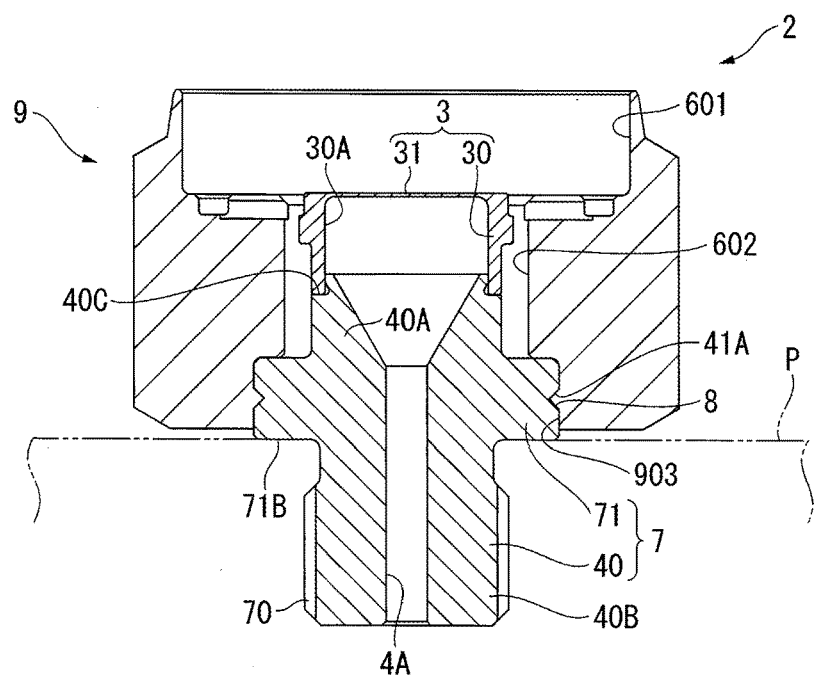
FIG. 4 is a cross section of the pressure sensor according to the second exemplary embodiment of the invention.

A pressure sensor 2 of the second exemplary embodiment is illustrated in FIGS. 3 and 4. The pressure sensor 2 of the second exemplary embodiment is different from the pressure sensor 1 of the first exemplary embodiment in the configuration of each of the joint, connection section and attachment member. The configuration of other components of pressure sensor 2 of the second exemplary embodiment is the same as that of the pressure sensor 1 of the first exemplary embodiment. In the description of the second exemplary embodiment, the explanation of components with the same reference signs as those of the first exemplary embodiment will be omitted.

As shown in FIGS. 3 and 4, the pressure sensor 2 includes the pressure sensor element 3, a joint 7 provided with a hole section 4A through which the fluid to be measured is introduced to the pressure sensor element 3, and the attachment member 9 configured to be fitted into the joint 7 through the connection section 8.

The shaft 40 and a joint flange 71 are integrated together to constitute the joint 7. The hole section 4A is formed along an axis core of the shaft 40. The joint flange 71 is formed to extend outwardly in a radial direction from an intermediate position of the shaft 40 in the axial direction.

A male thread 70 to be screwed into the target member P is formed at the second end 40B of the shaft 40, and an O-ring (not shown) is disposed between the male thread 70 and the joint flange 71.

The joint 7 is formed of a high nickel material as in the case of the joint 4 of the first exemplary embodiment.

An opposed surface 71B of the joint flange 71 facing the target member P abuts a surface of the target member P. A V-shaped groove 41A is circumferentially formed on an outer circumferential surface of the joint flange 71.

The attachment member 9 is formed of a material containing aluminum such as aluminum oxide, in addition to pure aluminum, as in the case of the first exemplary embodiment.

An outer circumferential portion of the attachment member 9 has the same profile as that of a hexagonal nut, and the outer circumferential surface of the attachment member 9 is a locking surface 9A that is locked with a tool so as to screw the joint 7 into the target member P. Incidentally, in the second exemplary embodiment, the profile of the outer circumferential portion of the attachment member 9 is not limited to the same profile as that of the hexagonal nut, but may be a polygon such as quadrangle, triangle and octagon, or combination of an arc and a chord. When the profile of the outer circumferential portion of the attachment member 9 is polygon, each surface defines the locking surface. When the profile of the outer circumferential portion of the attachment member 9 is the combination of the arc and the chord, the portion constituting the chord defines the locking surface.

The first inner circumferential portion 601, the second inner circumferential portion 602 and a third inner circumferential portion 903 are defined in the attachment member 9 in a continuous manner.

The connection section 8 is connected through so-called metal flow. Namely, the connection section 8 is formed when the outer circumferential portion of the joint flange 71 and the third inner circumferential portion 903 of the attachment member 9 are locally plastically deformed upon receiving a circumferential force and a part of the third inner circumferential portion 903 is bit into the groove 41A. At this time, a certain elastic deformation pressure remains at a deformed portion of the connection section 8 and the elastic deformation pressure is trapped at a connection portion (e.g., groove 41A). Accordingly, the joint 7 and the attachment member 9 are firmly axially connected.

Figure 5A:
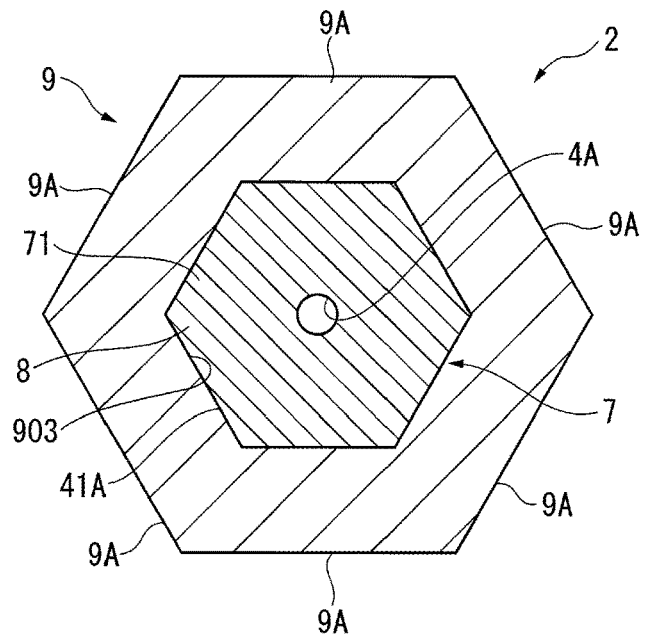
FIG. 5A is a plane cross section of a pressure sensor provided with a connection section having a different profile.
Figure 5B:
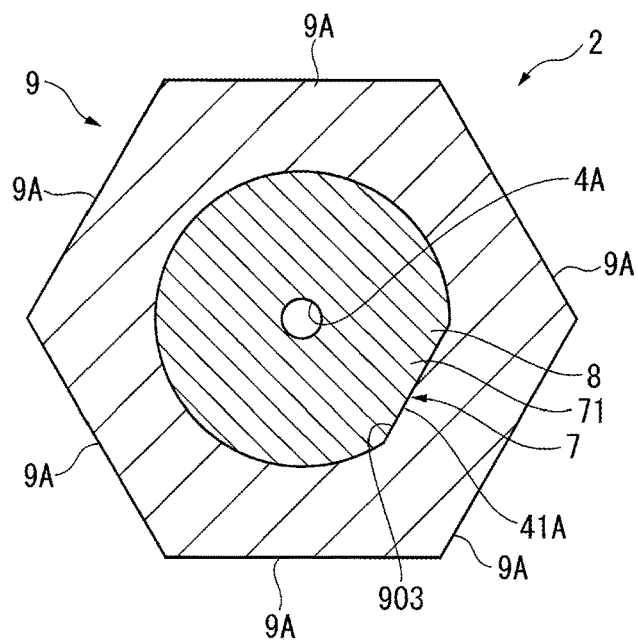
FIG. 5B is another plane cross section of a pressure sensor provided with a connection section having a different profile.

The cross sectional profile of the connection section 8 in a direction intersecting the axial direction has a non-circular portion, which is illustrated in FIGS. 5A and 5B.

FIG. 5A illustrates an example in which the cross sectional profile of the connection section 8 is a hexagon. In FIG. 5A, the cross sectional profile of the third inner circumferential portion 903 of the attachment member 9 is a hexagon, and the profile of the outer circumferential portion of the joint flange 71 is also a hexagon corresponding to the third inner circumferential portion 903. Since the connection section 8 is provided between the third inner circumferential portion 903 and the joint flange 71, the cross sectional profile of the connection section 8 is a hexagon. Incidentally, each surface of the hexagon defines the non-circular portion. In the second exemplary embodiment, the cross sectional profile of the connection section 8 is not limited to a hexagon, but may be a polygon such as a quadrangle, triangle and octagon.

FIG. 5B illustrates an example in which the cross sectional profile of the connection section 8 is the combination of an arc and a chord. In FIG. 5B, the cross sectional profile of the third inner circumferential portion 903 of the attachment member 9 is the combination of an arc and a chord, and the profile of the outer circumferential portion of the joint flange 71 is the combination of an arc and a chord corresponding to the third inner circumferential portion 903. Since the connection section 8 is provided between the third inner circumferential portion 903 and the joint flange 71, the cross sectional profile of the connection section 8 is the combination of an arc and a chord.

Incidentally, through one chord is illustrated in FIG. 5B, two or more chords may be present in the cross sectional profile of the connection section 8 in the second exemplary embodiment.

In order to assemble the pressure sensor 2 having the above configuration, at first, the pressure sensor element 3 is engaged with the joint 7, and the engaged portion is laser-welded along the entire circumference thereof. Subsequently, the joint 7 to which the pressure sensor element 3 is welded is pushed into the attachment member 9. While the joint flange 71 is in contact with the step between the second inner circumferential portion 602 and the third inner circumferential portion 903 of the attachment member 9, a predetermined pressing force is applied to the attachment member 9 using, for instance, a press machine to achieve the plastic deformation connection (metal flow) of the attachment member 9 and the joint flange 71.

The pressure sensor 2 thus assembled is screwed into the target member P using a tool.

The second exemplary embodiment can exhibit the following advantages in addition to the same advantages as described in (1) and (4) of the first exemplary embodiment.

(6) The joint 7 has a male thread 70 to be screwed into the target member P, and a locking surface 9A to be locked with a tool so as to screw the joint 7 into the target member P is formed on the outer circumferential portion of the attachment member 9. Accordingly, it is possible to easily attach the pressure sensor 2 to the target member P by screwing the attachment member 9 using a tool or the like. In particular, since the profile of the outer circumferential portion of the attachment member 9 is a hexagon, it is possible to easily attach the attachment member 9 to the target member P using a general-purpose tool.

(7) The cross sectional profile of the connection section 8 in the direction intersecting the axial direction has the non-circular portion. As compared to the case where the cross sectional profile of the connection section 8 is a circle, the attachment member 9 does not run idle at the time of screwing the attachment member 9 into the target member P. Accordingly, it becomes possible to apply larger torque for the screwing.

(8) Since the profile of the outer circumferential portion of the attachment member 9 has the same profile as that of a hexagonal nut, it is possible to easily attach the attachment member 9 to the target member P using a general-purpose tool.

It should be appreciated that the scope of the invention is not limited to the above-described exemplary embodiment(s) but includes modifications and improvements as long as such modifications and improvements are compatible with the invention.

For example, though the fluid to be measured is hydrogen and each of the pressure sensor element 3 and the joints 4 and 7 is formed of a high nickel material in the above exemplary embodiments, the fluid to be measured is not limited to hydrogen according to the invention. The material for each of the pressure sensor element 3 and the joints 4 and 7 is not particularly limited as long as the material is not embrittled upon being brought into the contact with the fluid to be measured and more rigid than the attachment member 6. Further, each of the pressure sensor element 3 and the joints 4 and 7 is entirely formed of a material (e.g., high nickel material) that is not embrittled upon being in contact with the fluid to be measured in the above exemplary embodiments. According to the invention, however, it is sufficient that at least the portion to be in contact with the fluid to be measured is formed of the material described above, and the material may be combined with other material(s).

Further, though each of the attachment members 6 and 9 is formed of a material containing inexpensive aluminum in the above exemplary embodiment, the specific material for the attachment members 6 and 9 is not limited as long as the material for the pressure sensor element 3 and the joints 4 and 7 is more rigid than the attachment members 6 and 9 according to the invention. The cross sectional profile of the groove 41A is not limited to the V-shape, but may be a U-shape or a rectangle. The number of the groove 41A is not limited to one, and may be two or more.

Further, according to the above exemplary embodiments, each of the portion of the connection section 5(8) that is formed on the outer circumferential portion of the joint flange 41(71) and the third inner circumferential portion 603(903) of the attachment member 6(9) in a circumferential direction is locally plastically deformed to bite into the groove 41A along the circumferential direction with an elastic deformation pressure. According to the invention, however, instead of the configurations in the above exemplary embodiments, each of the portion of the connection section 5(8) that is formed on the outer circumferential portion of the joint flange 41(71) and the third inner circumferential portion 603(903) in the axial direction may be locally plastically deformed to bite into one or a plurality of vertical grooves (not shown) provided along the axial direction (vertical direction) with an elastic deformation pressure. In this case, each of the groove 41A formed at the outer circumferential portion of the joint flange 41(71) and the third inner circumferential portion 603(903) and the vertical groove(s) may cross each other. Alternatively, the groove 41A may be formed in one area (upper half area) and the vertical groove(s) may be formed in the remaining area (lower half area).

What is claimed is:

1. A pressure sensor configured to detect a pressure of a fluid to be measured that embrittles a material, the pressure sensor comprising:
   a pressure sensor element configured to be displaced in accordance with the pressure of the fluid to be measured;
   a joint provided with a hole section through which the fluid to be measured is introduced to the pressure sensor element, the joint being configured to be provided to a target member; and
   an attachment member configured to be fitted into the joint through a connection section and connected to the target member, wherein
   a portion of each of the pressure sensor element and the joint, which is brought into contact with the fluid to be measured, is formed of a material that is not embrittled upon being in contact with the fluid to be measured and more rigid than the attachment member,
   the connection section comprises a deformation pressure trapping section into which at least one of an outer circumferential portion of the joint and the attachment member bites when being locally plastically deformed in a direction orthogonal to an axial direction of the at least one of the outer circumferential portion of the joint and the attachment member, the deformation pressure trapping section being formed in the other one of the outer circumferential portion of the joint and the attachment member, and
the joint and the attachment member are firmly axially connected to each other.

2. The pressure sensor according to claim 1, wherein
the attachment member comprises an abutting surface that abuts the target member near the outer circumferential portion remote from the hole section with respect to the connection section, and a step that is formed at a position near the hole section with respect to the abutting surface and brought into contact with the connection section, such that the step is spaced apart from the target member.

3. The pressure sensor according to claim 2, wherein
the joint comprises a joint flange having an outer circumferential surface on which the connection section is formed, an opposed surface is formed on the joint flange so as to face the target member, and
the opposed surface of the joint flange facing the target member is spaced apart from the target member.

4. The pressure sensor according to claim 1, wherein
the joint has a male thread configured to be screwed into the target member, and
a locking surface configured to be locked with a tool so as to screw the joint into the target member is formed on an outer circumferential portion of the attachment member.

5. The pressure sensor according to claim 4, wherein
a cross sectional profile of the connection section in a direction intersecting an axial direction of the connection section has a non-circular portion.

6. The pressure sensor according to claim 1, wherein
the attachment member is formed of a material containing aluminum.

* * * * *